No. 761,785. PATENTED JUNE 7, 1904.
D. RAIT, Jr.
CAR SEAT.
APPLICATION FILED NOV. 17, 1903.
NO MODEL.
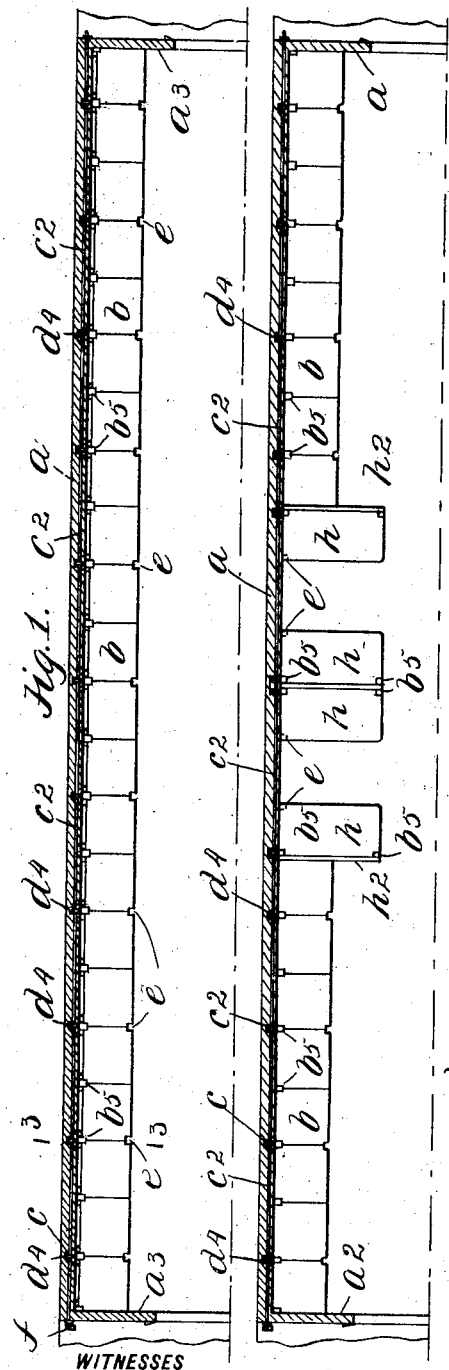
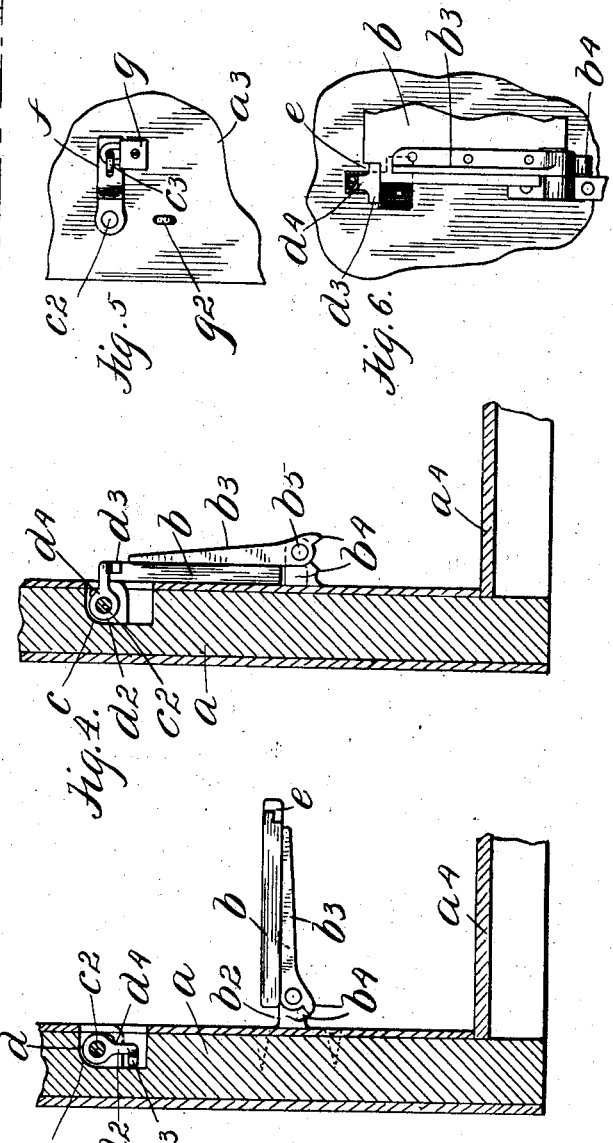
WITNESSES
INVENTOR
David Rait, Jr.
BY
Edgar Tate & Co.
ATTORNEYS No. 761,785. Patented June 7, 1904.

UNITED STATES PATENT OFFICE.

DAVID RAIT, JR., OF LARCHMONT MANOR, NEW YORK.

CAR-SEAT.

SPECIFICATION forming part of Letters Patent No. 761,785, dated June 7, 1904.

Application filed November 17, 1903. Serial No. 181,487. (No model.)

*To all whom it may concern:*

Be it known that I, DAVID RAIT, Jr., a citizen of the United States, residing at Larchmont Manor, in the county of Westchester and State of New York, have invented certain new and useful Improvements in Car-Seats, of which the following is a specification, such as will enable those skilled in the art to which it appertains to make and use the same.

This invention relates to seats for tramway or other cars; and the object thereof is to provide means whereby the seats of such cars may be raised and locked out of position for use, so as to increase the standing room in such cars when it is desired to do so.

It is a well-known fact that in certain cities the surface and other cars are at certain times in the day overcrowded, so that a large number of people have to stand up, and this is very inconvenient, both to people who are sitting down and those who are standing up; and one of the objects of this invention is to provide means whereby at such a time the seats may be raised and locked in an upright position adjacent to the sides of the car in such manner that all the space therein may be utilized for standing purposes, a further object being to provide means whereby a part or parts of the seats of a car may be utilized and the remainder thereof raised and locked in an upright position for the purpose hereinbefore specified; and with these and other objects in view the invention consists in a car or other vehicle provided with seats which are adapted to be held in position for use or swung into a vertical position and locked therein, so that they will not be capable of use.

The invention is fully disclosed in the following specification, of which the accompanying drawings form a part, in which the separate parts of my improvement are designated by suitable reference characters in each of the views, and in which—

Figure 1 is a sectional plan view of one side of a car provided with my improvement; Fig. 2, a similar view showing a modification; Fig. 3, a transverse section on the line 3 3 of Fig. 1 and showing a seat in position for use; Fig. 4, a view similar to Fig. 3, but showing the seat locked in a vertical position; Fig. 5, an end view of a part of the car and showing part of my construction, and Fig. 6 an inside view of a part of one side of a car and showing part of the construction which I employ.

In the drawings, forming part of this specification, I have shown at $a$ a part of one side of a car, at $a^2$ and $a^3$ the ends thereof, and at $a^4$ a part of the bottom of the car. I have also shown at $b$ a plurality of seats hinged to the side of the car, and in Fig. 1 these seats are shown all arranged adjacent to the side of the car in the manner of an ordinary street-car and as the seats are sometimes arranged in an elevated car. The seats $b$ are hinged to the side of the car, as shown at $b^2$ in Figs. 3 and 4, part of the hinge being secured to the side of the car and part being formed in connection with cross-pieces $b^3$, to which the seats $b$ are secured, and the separate parts of the hinge are provided with lugs, shoulders, or projections $b^4$, which operate to hold the seats horizontally when they are desired for use. The side of the car in the form of construction shown is provided with a longitudinal recess $c$, in which is placed a longitudinal rod $c^2$, which in the form of construction shown projects through the ends of the car, and this rod is provided with a plurality of collars $d$, which are secured thereto in any desired manner, and these collars are provided each with a projecting finger $d^2$, having a transverse cross-head $d^3$, and these parts, the collars $d$, the fingers $d^2$ thereof, and the cross-heads $d^3$ of said fingers form catches or locks to hold the seats in an upright position. In Figs. 2 and 3 of the drawings these locks or catches are indicated as a whole by the reference character $d^4$, and the rod $c^2$ is provided with a number of such locks or catches equal to half the number of the seats at the side of the car in the form of construction shown in Fig. 1, and the seats are preferably provided at their adjacent front edges with recesses $e$, and when the seats are swung into a vertical position the rod $c^2$ may be turned forwardly and downwardly, and in this operation the fingers $d^2$ drop into the recesses $e$ and the cross-heads $d^3$ engage the seats $b$ and hold said seats in an upright position. At one end of the car is hinged a hasp $f$, through which the corresponding end of the rod $c^2$ is passed, and the other end of said hasp is provided with an eye $c^3$, whereby an ordinary padlock $g$ may be connected therewith, and the said end of the car is also provided with a staple or similar device $g^2$, with which the padlock may be connected when not in use, all as shown in Fig. 5. As thus constructed it will be seen that the seats $b$ may be lowered for use whenever necessary, or they may be raised and locked in an upright position whenever desired, all that is necessary to accomplish this result being to turn the rod $c^2$ so as to raise the locking devices $d^4$, then raise the seats and turn the rod $c^2$ so that the locking devices $d^4$ will engage with the seats, and the rod $c^2$ may be secured in the last-named position by means of the padlock or any other suitable device, and when it is not desired to use the locks $d^4$ to hold the seats in a raised position the rod $c^2$ is turned so that the locking devices $d^4$ will be within the recess $c$ in the side of the car, as clearly shown in Fig. 3.

In Fig. 2 of the drawings I have shown one side of a car in which the seats are arranged horizontally and transversely as in some styles of elevated cars now in use, the transverse seats being arranged at the central portion of the car and being designated by the reference character $h$, and these seats are hinged to vertical backs $h^2$, the hinges being the same as those employed in connection with the seats $b$, and the rod $c^2$ is provided with the locks $d^4$, which operate in connection with the seats $h$ in the same manner as hereinbefore described with reference to the seats $b$, said seats $h$ being provided with recesses $e$, in connection with which the locks $d^4$ operate.

The hinges of the seats $b$ are designated as a whole by the reference character $b^5$, and similar hinges are used for the seats $h$; but my invention is not limited to the style of hinge herein shown and described, nor to the exact means for locking the seats in a vertical position, and any suitable means for supporting the various seats in a horizontal position may be employed, and changes in and modifications of the means for locking the seats in an upright or vertical position may also be employed without departing from the spirit of my invention or sacrificing its advantages.

It will be understood, of course, that both sides of a car may be provided with seats and means for holding the same in an upright position, as herein described, and the seats at one side of a car may be in use, while those at the opposite side are out of use, and means may be provided whereby part of the seats at one side only may be in use and part out of use.

Although the means for holding or locking the transversely-arranged seats $h$ in an upright position are herein described as the same in construction as those for holding the longitudinally-arranged seats out of use, it will be apparent that the locks connected with the rod or rods $c^2$ will have to be varied somewhat for holding the transversely-arranged seats in an upright position, and any suitable construction may be employed for this purpose. It will also be apparent that my improvement may be applied to various kinds and classes of vehicles as well as cars and by means thereof the entire space within a car or other vehicle may be used as standing room, or the said car or other vehicle may be provided with the usual seats whenever desired. The means for locking the rod $c^2$ may also be placed inside of the car instead of outside thereof, as herein shown and described, and any suitable means or device may be employed for turning said rod.

Having fully described my invention, what I claim as new, and desire to secure by Letters Patent, is—

1. A car or other vehicle provided with a plurality of seats hinged to the sides thereof and adapted to be folded into a vertical position, a single locking device for holding all of said seats in said position and means for operating said locking device, substantially as shown and described.

2. A car or other vehicle provided with a plurality of seats at the side thereof, part of said seats being arranged longitudinally of the car and part transversely thereof, said seats being all hinged and adapted to be folded into a vertical position, and a locking device for securing said seats in a vertical position, substantially as shown and described.

3. A car or other vehicle provided with a plurality of seats at the sides thereof, part of said seats being arranged longitudinally of the car and part transversely thereof, said seats being all hinged and adapted to be folded into a vertical position, and a locking device for securing said seats in a vertical position, said locking device being adapted to be operated from one end of the car, substantially as shown and described.

4. A car or other vehicle provided with a plurality of seats at the opposite sides thereof, all of said seats being hinged and adapted to be folded vertically adjacent to the sides of the car, and a single locking device for holding said seats in a vertical position, substantially as shown and described.

5. A car or other vehicle provided with a plurality of seats at the opposite sides thereof, all of said seats being hinged and adapted to be folded vertically adjacent to the sides of the car, and a single locking device for holding said seats in a vertical position, said locking device being adapted to be operated from one end of the car, substantially as shown and described.

6. A car or similar vehicle, the seats of which are arranged at the opposite sides thereof, all of said seats being hinged and adapted to be folded vertically, and locking devices for holding said seats in a vertical position, substantially as shown and described.

7. A car or similar vehicle, the seats of which are arranged at the opposite sides thereof, all of said seats being hinged and adapted to be folded vertically, and locking devices for holding said seats in a vertical position, said locking devices being adapted to be operated from one end of the car, substantially as shown and described.

In testimony that I claim the foregoing as my invention I have signed my name, in presence of the subscribing witnesses, this 14th day of November, 1903.

DAVID RAIT, Jr.

Witnesses:
F. A. STEWART,
C. J. KLEIN.